March 9, 1937.  O. JABELMANN  2,073,013
ARTICULATED TRAIN
Filed Oct. 14, 1935
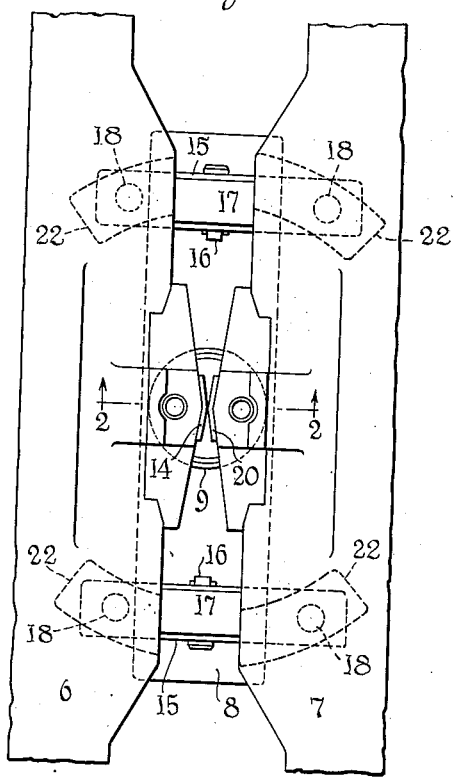
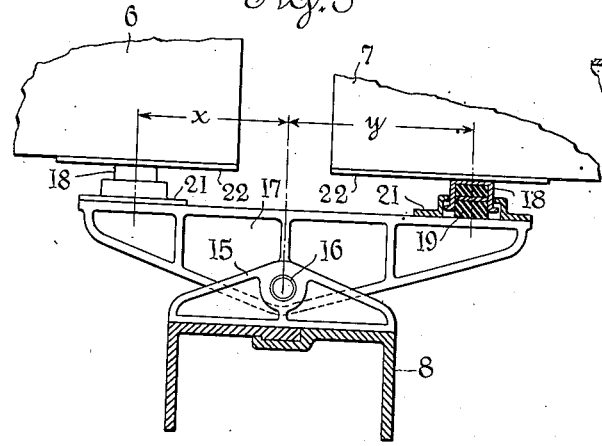
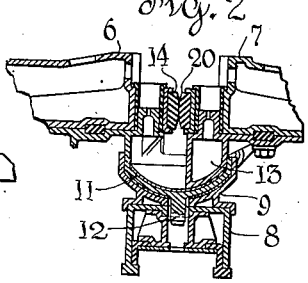
Inventor
Otto Jabelmann
By
Attorneys Patented Mar. 9, 1937

2,073,013

UNITED STATES PATENT OFFICE 2,073,013

ARTICULATED TRAIN

Otto Jabelmann, Omaha, Nebr.

Application October 14, 1935, Serial No. 44,960

6 Claims. (Cl. 105—4)

This invention relates to what are commonly termed articulated trains for use on railways and particularly to details having to do with the support of adjacent car body ends on a single bogie truck.

Generally stated, an articulated train comprises two or more body sections which are hinged together at their adjacent ends, the hinge being supported by a single bogie truck. The other ends of the end cars of the train are supported each by a bogie truck, which so far as the present invention is concerned, may be of conventional form. A typical two car train of this general description is illustrated in Fig. 249D of "Springs and Suspension", Sanders, Spon & Chamberlain, N. Y. 1930, and a typical bogie truck with center bearing for two articulated car bodies is illustrated in Fig. 190 of the same book. In case more than two car bodies make up the articulated train the invention may be applied wherever the ends of two adjacent cars of unequal weight are supported by a single truck.

With trains of the articulated type it is desirable to provide side bearings which transfer a part of the weight of the car to the load bearing member (usually the bolster) of the truck, and which will permit the necessary rocking motion of the car bodies, while exercising a restraining or neutralizing tendency thereon.

To accomplish this result, it has been proposed to mount on the bolster at each side of the truck a side bearing support of the equalizing lever type, and each comprising a lever fulcrumed at its middle on a horizontal axis carried by the bolster. The opposite ends of the lever engage the lower faces of the end sills of respective car bodies with which they are in sliding supporting engagement.

In the course of development of high speed articulated trains, it has been found necessary to connect car body units of substantially different weights in a single articulated train. The present invention contemplates the use of equalizing side bearing levers having arms of unequal length where they support car bodies of unequal weight. The lengths of the lever arms are approximately proportional, inversely, to the weights of the two supported cars. In this way better riding qualities are secured because the forces developed to resist side sway are coordinated with the weights of the car bodies.

An exemplary embodiment of the invention will now be described with reference to the accompanying drawing, in which,—

Fig. 1 is a plan view of the end portions of two coupled car bodies and the supporting truck bolster, showing the improved side bearings applied.

Fig. 2 is a section on the line 2—2 of Fig. 1.

Fig. 3 is a side elevation on a somewhat enlarged scale, showing the equalizing side bearing in relation to the car bodies and bolster.

Since the truck and the car bodies may be of any suitable construction, structural details are omitted, and only the bolster of the truck is indicated. The truck may be of any known construction suited to the service, a swing motion truck being preferred. While a bolster is shown and described, it typifies the load bearing element of the truck whether that element be what is technically known as a bolster or some generally equivalent load bearing element of the truck.

In the drawing, 6 represents the end sill or equivalent structural frame element of the heavier of the two cars, while 7 represents the corresponding element of the lighter car. The bolster of the truck is indicated at 8.

Mounted at mid-length of the bolster and on its top is a center-bearing 9, generally spherical in form and concave. This receives a mating generally spherical concavo-convex center plate 11 rigidly mounted on one of the end sills, in the example illustrated on sill 6. The center plate 11 serves as a sort of universal king pin, and carries a downwardly extending pin 12 which projects freely through an opening at the center of center bearing 9. The amount of universal motion is limited to the amount of clearance around pin 12 but is sufficient to accommodate the limited angular motion encountered in railroad service.

Working in the concave upper face of center plate 11, and fitting the same, is a second center plate 13 which is rigidly attached to the other end sill, in the example illustrated, to sill 7. This serves as a king pin to connect the second car body to the first car body and to the truck. Beveled bumper blocks 14, 20, carried by sills 6 and 7, engage to limit approach of the sills toward one another.

The type of center plate as described and as shown on the drawing is typical and any other suitable center plate arrangement for articulated trucks may be employed and entire construction so far described is conventional, or at least no novelty is here claimed for it.

Mounted near each end of bolster 8 is a corresponding slotted casting 15 which supports a horizontal fulcrum pin 16. The pins 16 are axially aligned, and each carries a corresponding equalizing lever 17. The opposite ends of each lever 17 underlie and enter into supporting engagement with the end sills 6 and 7.

It is desirable to afford yielding contact between the end sills 6 and 7 and the ends of levers 17, and this can be done in a variety of ways. As an example, there are illustrated flanged thrust heads 18 which are sustained by rubber blocks 19 and which are confined by the bases 21 fast on the ends of levers 17 and overlying the flanges on the heads. The heads 18 engage wear plates 22 on bottom of end sills. It is essential to provide sliding contact between the sills and the ends of the levers, and desirable to provide some yielding action, which conveniently can be localized at the area of sliding contact, as shown.

The effective arm $x$ of each lever 17, which supports the heavier car, is shorter than the effective arm $y$ of the same lever which supports the lighter car. The effect of the levers 17 is to constrain the car bodies to rock 180° out of phase, so that the two car bodies react upon each other to restrain or damp out rocking tendencies simultaneously imparted to both by their common truck. By dimensioning the lever arms in inverse proportion to car body weights, the restraining forces are kept approximately equal, and consequently as good action can be had with cars of unequal weight, as was heretofore had only with cars of equal weight.

The specific structure disclosed is illustrative and not limiting, and modifications within the scope of the invention are contemplated.

What is claimed is,—

1. In an articulated train structure, the combination of a truck; car body structures of unequal weight having adjacent ends carried by said truck; and side bearings comprising levers fulcrumed on the truck with their opposite ends in sliding supporting engagement with respective car bodies, the effective lever arms being approximately proportional inversely to the weights of the supported cars.

2. In an articulated train structure, the combination of a truck; car body structures of unequal weight having adjacent ends carried by said truck; side bearings comprising levers fulcrumed on the truck with their opposite ends in sliding supporting engagement with respective car bodies, the effective lever arms being approximately proportional inversely to the weights of the supported cars; and yielding means associated with said side bearing levers and with said levers forming a yielding load transmitting connection between the car bodies and the truck.

3. In an articulated train structure, the combination of a truck; car body structures of unequal weight having adjacent ends carried by said truck; side bearings comprising levers fulcrumed on the truck with their opposite ends in sliding supporting engagement with respective car bodies, the effective lever arms being approximately proportional inversely to the weights of the supported cars; and yielding means interposed between said levers and at least one car body.

4. In an articulated train structure, the combination of a truck; car body structures of unequal weight having adjacent ends carried by said truck; side bearings comprising levers fulcrumed on the truck and their opposite ends in sliding supporting engagement with respective car bodies, the effective lever arms being approximately proportional inversely to the weights of the supported cars; and yielding means interposed between said levers and each car body.

5. In an articulated train structure, the combination of a truck; car body structures of unequal weight having a common universal hinge connection with each other and with said truck; and equalizing side bearing structures common to the two car bodies for transmitting a part of the load of each to the truck, said structures each including a lever of the first order fulcrumed on the truck and having unequal arms, the shorter of which is in supporting relation with the heavier car and the longer in supporting relation with the lighter car.

6. In an articulated train structure, the combination of a truck; car body structures of unequal weight having a common universal hinge connection with each other and with said truck; equalizing side bearing structures common to the two car bodies for transmitting a part of the load of each to the truck, said structures each including a lever of the first order fulcrumed on the truck and having unequal arms, the shorter of which is in supporting relation with the heavier car and the longer in supporting relation with the lighter car; and load sustaining yielding means interposed in said side bearing structures and coacting with said levers to form a yielding load transmitting connection between the car bodies and the truck.

OTTO JABELMANN.